US008567444B2

(12) United States Patent
Marin et al.

(10) Patent No.: US 8,567,444 B2

(45) Date of Patent: Oct. 29, 2013

(54) ACCUMULATOR ASSEMBLY

(75) Inventors: Carlos E. Marin, Oxford, MI (US); Leonid Basin, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 224 days.

(21) Appl. No.: 13/152,974

(22) Filed: Jun. 3, 2011

(65) Prior Publication Data

US 2012/0085450 A1 Apr. 12, 2012

Related U.S. Application Data

(60) Provisional application No. 61/391,309, filed on Oct. 8, 2010.

(51) Int. Cl.
*F16L 55/04* (2006.01)

(52) U.S. Cl.
USPC ... 138/31; 137/625.61; 123/447; 251/129.08; 251/297; 138/26; 138/30

(58) Field of Classification Search
USPC ............ 138/26, 27, 28, 30, 31; 417/416, 417; 251/129.08; 137/625.61; 123/447; 180/53.4, 165; 280/216
See application file for complete search history.

(56) References Cited

U.S. PATENT DOCUMENTS 2,934,256 A * 4/1960 Lenning ........................ 417/274
3,567,135 A * 3/1971 Gebert .......................... 239/463
3,903,696 A * 9/1975 Carman .......................... 60/414
4,201,522 A * 5/1980 Toyota et al. ................. 417/311
4,275,693 A * 6/1981 Leckie .......................... 123/447
4,292,947 A * 10/1981 Tanasawa et al. ............. 123/445
4,387,677 A * 6/1983 Guerrier .................... 123/179.7
4,512,546 A * 4/1985 Inada et al. ..................... 251/65
4,799,048 A * 1/1989 Goshima et al. .............. 340/626
4,877,187 A * 10/1989 Daly .............................. 239/89
5,078,242 A * 1/1992 Ratke et al. ...................... 477/96
5,179,868 A 1/1993 Thibeault
5,603,244 A * 2/1997 Tischer ........................ 74/500.5
6,029,703 A * 2/2000 Erickson et al. ......... 137/625.61
6,698,555 B2 3/2004 Schafer et al.
6,701,797 B2 3/2004 Heuver
6,866,066 B2 * 3/2005 Weber ............................ 138/31
6,983,668 B2 1/2006 Powell et al.
7,192,005 B2 * 3/2007 Denyer et al. ............ 251/129.08
7,765,973 B2 * 8/2010 Matsuda .................... 123/90.65
7,814,751 B2 * 10/2010 Ebert .............................. 60/562
7,992,592 B2 * 8/2011 Lauterbach ..................... 138/31
8,360,931 B2 * 1/2013 Keeney et al. ................ 477/175
2004/0011609 A1 * 1/2004 Schmid ......................... 188/265

(Continued)

FOREIGN PATENT DOCUMENTS

JP 61253224 11/1986
JP 01199035 8/1989

*Primary Examiner* — Kevin P Shaver
*Assistant Examiner* — Christopher Luzecky

(57) ABSTRACT

An accumulator assembly for a motor vehicle powertrain includes an armature and a follower. Together the armature and the follower can selectively lock together. The accumulator assembly may include a biasing member and a solenoid. When the solenoid is de-energized, the biasing member pushes the armature towards the follower to lock the armature and the follower together. When the solenoid is energized, the armature is magnetically drawn towards the solenoid and away from the follower to unlock the two components and to compress the biasing member.

16 Claims, 2 Drawing Sheets

Figure 1:
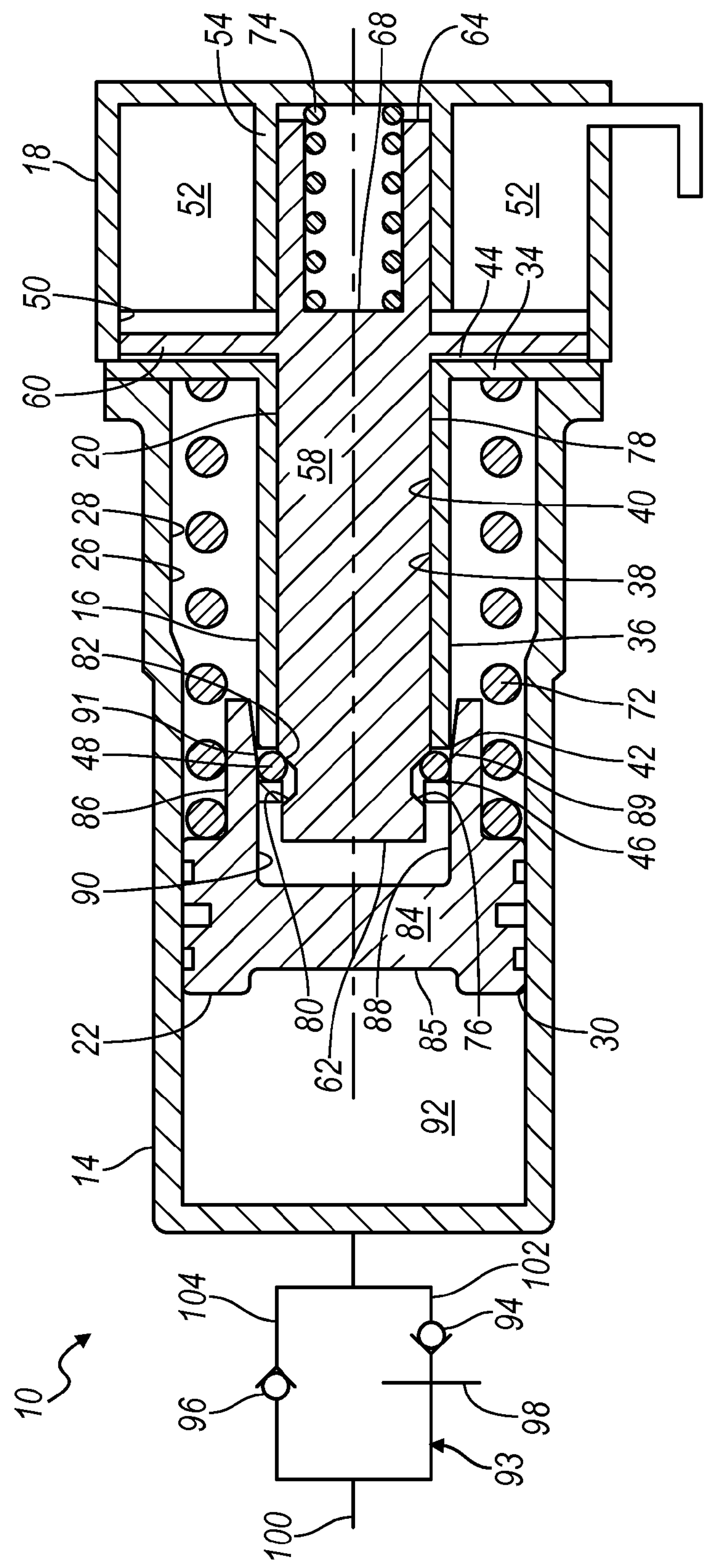

10 14 22 90 86 48 91 82 16 26 28 20 60 50 18 96 104 52 54 74 100 80 62 58 88 68 84 92 85 76 44 34 52 64 93 98 94 102 30 46 89 42 72 36 38 40 78

(56) References Cited

U.S. PATENT DOCUMENTS

2005/0118043 A1* 6/2005 Liu et al. ....................... 417/415
2005/0155658 A1* 7/2005 White ............................ 138/31
2008/0308168 A1* 12/2008 O'Brien et al. ................. 138/31
2009/0007863 A1* 1/2009 Matsuda .................... 123/90.14
2009/0158877 A1* 6/2009 Vernacchia et al. ....... 74/473.24
2009/0293977 A1* 12/2009 Lauterbach ..................... 138/31
2009/0293978 A1* 12/2009 Lauterbach ..................... 138/31
2010/0167872 A1* 7/2010 Shirasaka et al. ............... 477/45
2010/0206389 A1* 8/2010 Kennedy et al. ................ 137/14
2012/0011997 A1* 1/2012 Stephenson et al. ............ 91/468
2012/0251359 A1* 10/2012 Neelakantan et al. ........ 417/416

* cited by examiner

ACCUMULATOR ASSEMBLY

RELATED APPLICATION

This application claims the benefit of U.S. Provisional Application No. 61/391,309, filed Oct. 8, 2010. The entire contents of the above application are incorporated herein by reference.

TECHNICAL FIELD

The present disclosure relates to an accumulator for a powertrain in a motor vehicle. More specifically, the disclosure relates to an accumulator with a ball and ramp latch mechanism.

BACKGROUND

The statements in this section merely provide background information related to the present disclosure and may not constitute prior art.

A typical vehicle powertrain includes an engine and a transmission. In certain powertrains, the engine is selectively turned on and off. That is, as the vehicle comes to a stop, the engine is automatically stopped under a predetermined stop condition, and then, under a predetermined restart condition, the engine is restarted. These powertrains may further include a hydraulic control system with an accumulator that is arranged to discharge a fluid to a torque transmitting device, such as, for example, a clutch when the engine is restarted, to accumulate the fluid when the engine is on, and to retain the fluid when the engine is turned off.

Some accumulators discharge the fluid with a piston loaded by a compressed gas and accumulate the fluid by releasing the gas. Such accumulators, however, have to be capable of selectively sealing in pressurized gas. Accordingly, there is room in the art for an accumulator assembly that does not require the complexity associated with sealing pressurized gas within the assembly.

SUMMARY

In one form of the present invention, an accumulator assembly for a motor vehicle powertrain includes an armature and a follower. Together the armature and the follower can selectively lock together. The accumulator assembly may include a biasing member and a solenoid. When the solenoid is de-energized, the biasing member pushes the armature towards the follower to lock the armature and the follower together. When the solenoid is energized, the armature is magnetically drawn towards the solenoid and away from the follower to unlock the two components and to compress the biasing member.

In a particular form, when the vehicle's engine is on and running, the armature and the follower are locked together so that a fluid flows from a torque transmitting device associated with the vehicle's transmission into the accumulator assembly. When the engine stops, the follower and the armature remain locked together, and the fluid is retained in the accumulator assembly. And when the engine restarts, the armature and the follower unlock from each other to discharge the fluid from the accumulator assembly, such that the discharged fluid flows, directly or indirectly, to the torque transmitting device.

Some embodiments of the accumulator assembly may have one or more of the following advantages. The accumulator assembly may be less expensive to manufacture than accumulators that require sealing in a pressurized gas. Moreover, the accumulator assembly may be located internally within a transmission, unlike accumulators that employ a pressurized gas.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
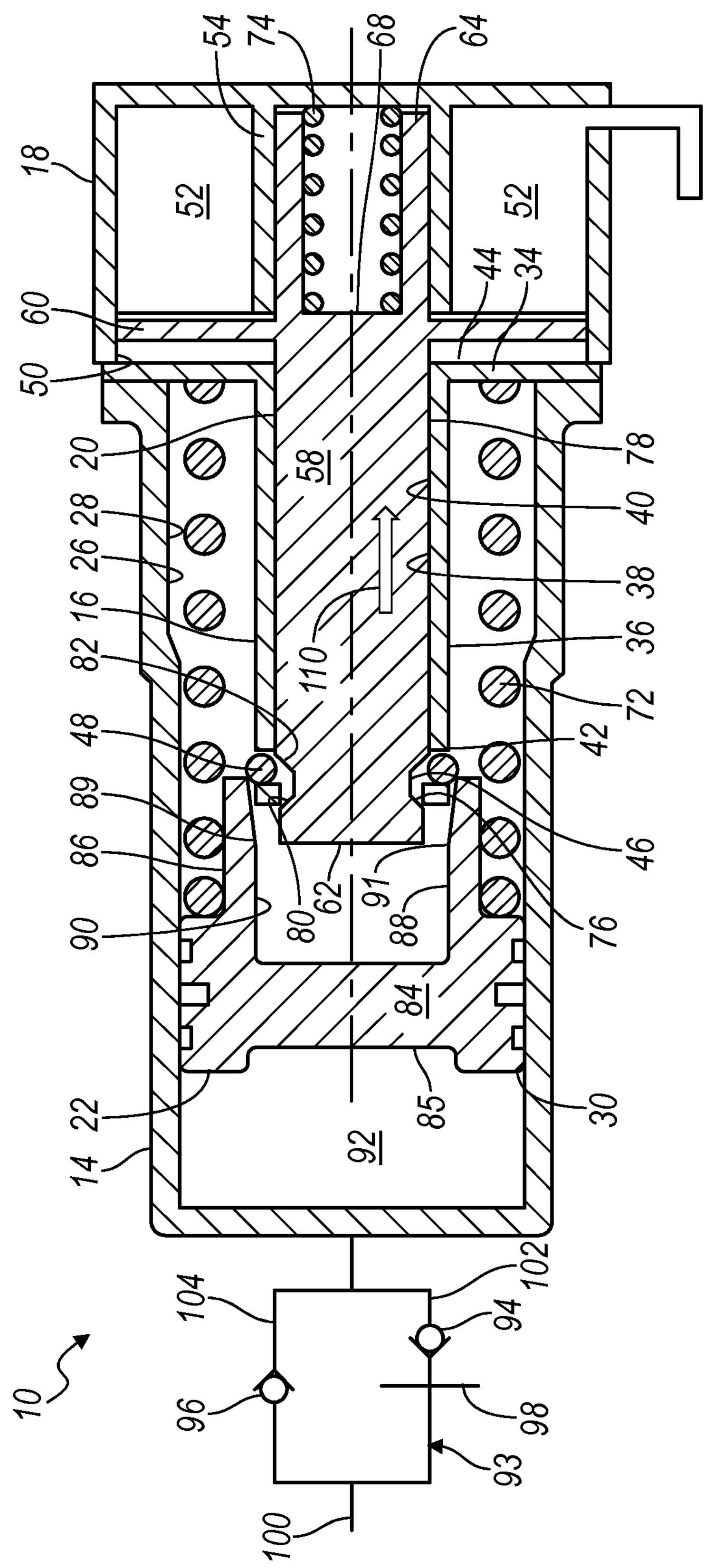

The drawings described herein are for illustration purposes only and are not intended to limit the scope of the present disclosure in any way. The components in the figures are not necessarily to scale, emphasis instead being placed upon illustrating the principles of the invention. Moreover, like reference characters designate corresponding parts throughout the different views. In the drawings:

FIG. 1 is a schematic cross-sectional diagram of an accumulator with a ball and ramp latch mechanism in a locked position in accordance with an embodiment of the present invention; and FIG. 2 is a schematic cross-sectional diagram of the accumulator in an unlocked position in accordance with an embodiment of the present invention.

DETAILED DESCRIPTION

The following description is merely exemplary in nature and is not intended to limit the present disclosure, application, or uses.

Referring now to FIGS. 1 and 2, an accumulator assembly embodying the principles of the present invention is illustrated therein and designated at 10. The accumulator assembly is employed in a motor vehicle's powertrain which typically includes an engine and a transmission. The accumulator assembly 10 accumulates a fluid, directly or indirectly, from a torque transmitting device, such as, for example, a clutch, when the vehicle's engine is turned on, retains the fluid when the engine is turned off, and discharges the fluid, directly or indirectly, back to the torque transmitting device when the engine is restarted.

As its primary components, the accumulator assembly 10 includes a valve body or housing 14, an inner sleeve 16, a solenoid body 18, an armature 20, and a follower 22. The valve body 14 is generally cylindrical in shape and includes a bore surface 26 that defines a valve bore 28. The valve body 14 further includes an open end 30 that communicates with the valve bore 28.

The inner sleeve 16 includes a body portion 34 and a sleeve extension 36 that extends axially from the body portion 34. The inner sleeve 16 also includes an inner sleeve surface 38 that defines a bore 40. The bore 40 extends through the sleeve extension 36 and the body portion 34. A first opening 42 is located at one end of the sleeve extension 36 and communicates with the bore 40, and a second opening 44 is located near the body portion 34 and also communicates with the bore 40. The sleeve extension 36 includes a plurality of holes 46 that extend through the sleeve extension 36 and communicate with the bore 40. A plurality of bearings 48 is located within the holes 46. The bearings 48 are preferably ball bearings, though other types of bearings may be employed without departing from the scope of the present invention. Additionally, while only two bearings 48 are illustrated throughout the two views, it should be appreciated that any number of bearings 48 may be employed without departing from the scope of the present invention. The inner sleeve 16 is attached or otherwise coupled to the valve body 14 such that the inner sleeve 16 and the valve body 14 are coaxial. More specifically, the sleeve extension 36 extends into the valve bore 28 of the valve body 14, and the body portion 34 is at least partially located within the second opening 32 of the valve body 14.

The solenoid body 18 is attached or otherwise coupled to the body portion 34 of the inner sleeve 16. The solenoid body 18 and the body portion 34 cooperate to define a central cavity 50 within the solenoid body 18. A solenoid coil 52 is located within the central cavity 50. The solenoid coil 52 is selectively energized to produce a magnetic force, as is known in the art. The solenoid coil 52 is supported within the cavity 50 by a hollow cylindrical shaft 54 coupled at an end thereof to the solenoid body 18. The hollow cylindrical shaft 54 is preferably coaxial with the valve body 14 and the inner sleeve 16.

The armature 20 includes a longitudinal body 58 and an arm 60. The arm 60 extends radially from the body 58 and is located between a first end 62 of the body 58 and a second end 64 of the body 58. A first biasing member such as, for example, a tolerance spring 72 is located within the bore 28 between the body portion 34 of the inner sleeve 16 and the follower 22. While the tolerance spring 72 is illustrated as a coiled spring in the present embodiment, it should be appreciated that any kind of biasing member, including a gas, may be employed without departing from the scope of the present invention. The second end 64 includes an aperture 68 that is coaxial with and extends into the body 58. A second biasing member such as, for example, an armature spring 74 is at least partially located within the aperture 68. While the armature spring 74 is illustrated as a coiled spring in the present embodiment, it should be appreciated that any kind of biasing member, including a gas, may be employed without departing from the scope of the present invention. The armature spring 74 engages the solenoid body 18, as will be described in greater detail below. The armature spring 74 preferably has a stiffness less than that of the tolerance spring 72.

The armature 20 also includes a detent 76 located on an outer surface 78 of the body 58 proximate to the first end 62. The detent 76 includes an angled front face 80 and an angled back face 82. The detent 76 is sized to accommodate the bearing 48, as will be described in greater detail below. The detent 76 may be a single circumferential groove that extends along the entire circumference of the body 58 or a plurality of discrete detents without departing from the scope of the present invention. The armature 20 is disposed in and is able slide within the bore 40 of the inner sleeve 16 such that the first end 62 extends from the first opening 42 of the inner sleeve 16 and is able to slide within the shaft 54 of the solenoid body 18 such that the second end 64 is located within the shaft 54 and the arm 60 extends into the cavity 50. The armature 20 is moveable relative to the valve body 14, the inner sleeve 16, and the solenoid body 18 between a first or locked position, as illustrated in FIG. 1, and a second or unlocked position, as illustrated in FIG. 2. The armature spring 74 biases the armature 20 to the locked position, and the spring 72 biases the follower 22 and the armature 20 away from each other.

The follower 22 includes a head portion 84 and a collar 86. The head portion 84 includes an outer surface 85, which with the inner surface 26 of the valve body 14 define a chamber 92. The collar 86 extends longitudinally from the head portion 84 and includes an inner surface 88. The inner surface 88 defines a bore 90. The collar 86 further includes a ramp 89 with an optionally detent 91. The detent 91 may be a single circumferential groove extending around the inner circumference of the collar 86 or a plurality of discrete detents without departing from the scope of the present invention. The follower 22 is disposed and able to slide within the valve bore 28 of the valve body 14. More specifically, the head portion 84 extends out from the first open end 30 of the valve body 14 and the collar 86 extends into the valve bore 28 between the valve body 14 and the sleeve extension 36 of the inner sleeve 16. The follower 22 is moveable relative to the valve body 14, the inner sleeve 16, and the solenoid body 18 between the locked position, as illustrated in FIG. 1, and the unlocked position, as illustrated in FIG. 2. The combination of the bearings 48 and the ramp 89 form a latch mechanism that locks the follower 22 and the armature 20 together in the locked position and unlocks the follower 22 and armature 20 when the bearings 48 disengage from the ramp 89. The locked position and the unlocked position of the follower 22 correlate to the accumulator assembly 10 accumulating the fluid to and discharging the fluid from the chamber 92, respectively.

During operation of the accumulator assembly 10, when the vehicle engine is restarted, the solenoid coil 52 is energized such that the arm 60 is magnetically drawn towards the solenoid coil 52 to pull the armature 20 away from the follower 22 (unlocked position, FIG. 2), as indicated by arrow 110 This movement along with the bias of the spring 72 disengages the bearings 48 from the ramp 89 of the follower 22 and from the detent 91 if the ramp 89 includes such a detent. The force from the spring 72 further biases the follower 22 away from the armature 20 to reduce the volume of the chamber 92. Accordingly, the decrease in the volume of the chamber 92 discharges the fluid from the accumulator assembly 10.

As the fluid is being discharged, the fluid can be transmitted directly to a torque transmitting device, such as, for example, a clutch, or indirectly to the clutch through a valve body control system. Specifically, as indicated by a control flow diagram 93, during discharge of the fluid from the accumulator assembly 10, the fluid pressure in a line 104 increases which opens a check valve 96 such that the discharged fluid flows through a discharge line 100, directly or indirectly, to the clutch to minimize the delay in engaging the clutch and, hence, to minimize or reduce the power transfer delay to the vehicle's drive wheels.

After the engine has been restarted and remains on, the solenoid coil 52 is de-energized. As such, the armature spring 74, which was previously compressed during restart of the engine, biases the armature 20 away from the solenoid coils 52 and towards the follower 22. During this movement, the bearings 48 roll up the ramp 89, and, in certain implementations, engage with the detent 91, of the collar 86 such that the bearings 48 are pressed between the ramp 89 and the angled back face 82 of the detent 76 to lock the armature 20 and the follower 22 together, which, thereby, compresses the spring 72 and increases the volume of the chamber 92 (locked position, FIG. 1). Accordingly, the pressure in the line 104 decreases such that the check valve 96 closes and a check valve 94 opens from the fluid pressure in an inlet line 98 through which fluid flows directly from the clutch or indirectly from the clutch via the valve body control system through a line 102 into the chamber 92 where the fluid accumulates.

When the vehicle's engine is turned off, the bearings 48 remain engaged with the ramp 89 such that the follower 22 and the armature 20 remain locked together, the volume in the chamber neither increases nor decreases, and both of the check valves 94 and 96 close so that the chamber 92 retains the previously accumulated fluid.

The description of the invention is merely exemplary in nature and variations that do not depart from the gist of the invention are intended to be within the scope of the invention.

Such variations are not to be regarded as a departure from the spirit and scope of the invention.

What is claimed is:

1. An accumulator assembly for a motor vehicle powertrain comprising:

a valve body having a longitudinal axis, the valve body having an inner surface that defines a bore;

an inner sleeve attached to and located within the valve body, the inner sleeve being coaxial with the longitudinal axis of the valve body;

a bearing element positioned near an end of the inner sleeve;

a follower located within the valve body and being coaxial with the longitudinal axis of the valve body, the follower having a ramp that is engagable with the bearing element and having an outer surface that together with the bore of the valve body define a chamber;

an armature positioned within the inner sleeve and being coaxial with the longitudinal axis of the valve body, the armature having a detent that accommodates the bearing element, wherein the armature and the follower are moveable along the longitudinal axis between an unlocked position and a locked position; and a solenoid proximate the armature, the solenoid being operable to move the armature to the unlocked position, wherein the bearing element engages the ramp of the follower in the locked position and disengages from the ramp in the unlocked position, the volume of the chamber in the locked position being greater than the volume of the chamber in the unlocked position, and wherein when the motor vehicle remains on, the solenoid is de-activated and the armature and the follower lock together in the locked position, and wherein the volume of the chamber increases to draw the fluid into the chamber.

2. The assembly of claim 1 wherein the solenoid includes a solenoid coil that is energized to magnetically draw the armature away from the follower to the unlocked position.

3. The assembly of claim 1 further comprising a first biasing member located between a body portion of the inner sleeve and the follower, the first biasing member being biased to push the follower and the armature away from each other.

4. The assembly of claim 3 wherein the first biasing member is a spring.

5. The assembly of claim 3 further comprising a second biasing member located partially within an aperture of the armature, second biasing member being biased to push the armature towards the follower.

6. The assembly of claim 5 wherein the second biasing member is a spring.

7. The assembly of claim 1 wherein the ramp includes a detent that engages with the bearing element in the locked position.

8. The assembly of claim 7 wherein the detent of the ramp is a circumferential groove.

9. The assembly of claim 7 wherein the detent of the ramp is a plurality of discrete detents.

10. The assembly of claim 1 wherein the detent on the armature is a circumferential groove.

11. The assembly of claim 1 wherein the detent on the armature is a plurality of discrete detents.

12. The assembly of claim 1 wherein the bearing element is a plurality of bearings.

13. An accumulator assembly for a motor vehicle powertrain comprising:

a valve body having a longitudinal axis, the valve body having an inner surface that defines a bore;

an inner sleeve attached to and located within the valve body, the inner sleeve being coaxial with the longitudinal axis of the valve body;

a bearing element positioned near an end of the inner sleeve;

a follower located within the valve body and being coaxial with the longitudinal axis of the valve body, the follower having a ramp that is engagable with the bearing element and having an outer surface that together with the bore of the valve body define a chamber; and an armature positioned within the inner sleeve and being coaxial with the longitudinal axis of the valve body, the armature having a detent that accommodates the bearing element, wherein the armature and the follower are moveable along the longitudinal axis between an unlocked position and a locked position;

a solenoid coupled to the valve body proximate the armature, the solenoid having a coil operable to move the armature to the unlocked position when the solenoid is activated, and wherein the bearing element engages the ramp of the follower in the locked position and disengages from the ramp in the unlocked position, the volume of the chamber in the locked position being greater than the volume of the chamber in the unlocked position, and wherein when the motor vehicle remains on, the solenoid is de-activated and the armature and the follower lock together in the locked position, and wherein the volume of the chamber increases to draw the fluid into the chamber.

14. The assembly of claim 13 wherein when the motor vehicle is started, the solenoid is activated to move the armature to the unlocked position.

15. The assembly of claim 13 wherein when the motor vehicle is turned off, the chamber retains the fluid previously accumulated.

16. The assembly of claim 13 further comprising a first biasing member located between a body portion of the inner sleeve and the follower, the first biasing member being biased to push the follower and the armature away from each other, and further comprising a second biasing member located partially within an aperture of the armature, the second biasing member being biased to push the armature towards the follower.

* * * * *